March 29, 1960 L. C. BROWN 2,931,021

ILLUMINABLE CONTROLLER

Filed July 16, 1957

INVENTOR
L. C. BROWN
BY John C. Morris
ATTORNEY 2,931,021

ILLUMINABLE CONTROLLER

Louis C. Brown, Rockaway, N.J., assignor to Bell Telephone Laboratories, Incorporated, New York, N.Y., a corporation of New York Application July 16, 1957, Serial No. 672,274

9 Claims. (Cl. 340—282)

Figure 1:
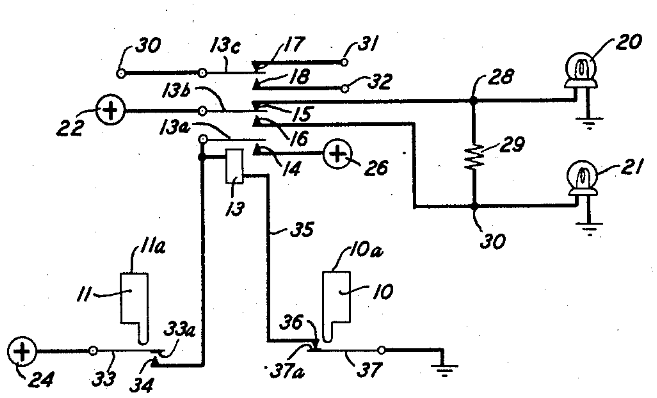

This invention relates to circuit controllers, and more particularly to illuminable circuit controllers.

One well recognized trend in the development of electrical control systems has been their tendency toward ever-increasing complexity. An accompanying trend has been an increase in the number and complexity of circuit controllers employed in such systems. During the course of this development a need has existed for a relatively simple, reliable controller, the state of operation and identification of which would be readily apparent.

An object of the present invention is an improved circuit controller.

More specifically, an object of this invention is an illuminable circuit controller, the state of operation and identification of which are readily determinable.

Another object of the present invention is a circuit controller which utilizes two levels of illumination to indicate its state of operation.

Still another object of this invention is an improved latching-type circuit controller.

These and other objects of the present invention are realized in an illustrative embodiment thereof which includes two momentary contact push button devices. Each device includes an illuminable caption portion and a translucent body member secured thereto. Positioned within or behind each translucent member is a light source which serves to illuminate the front or caption portion.

The body portion of each device includes a projection which engages, when a button is actuated, a set of contacts positioned in operative relation with the body portion. An actuated or depressed button is returned to its unoperated position by a spring element.

Electrical connections, made from the light sources and contact sets of the described button devices to associated circuitry, form an electrical controller illustrative of the principles of this invention. The associated controller circuitry is arranged so that with power applied to the controller one of the button captions is relatively brightly lighted while the other is relatively dimly illuminated. When the more dimly illuminated button is depressed, the illustrative embodiment operates to change the condition of a controlled circuit and, as an indication of this change, the illumination level of the actuated button is raised and the illumination level of the caption of the other button is lowered.

The associated circuitry includes a resistive element. It is the switching of this element from series circuit relation with one light source to series circuit relation with the other light source that selectively controls the levels of illumination of the described buttons.

Accordingly, a feature of the present invention is a circuit controller comprising two illuminable push buttons, and means for switching a resistive element from the light source circuit of one push button to that of the other button, whereby a difference in the illumination levels of the buttons is related to their state of operation.

Another feature of this invention is a circuit controller having two control buttons, each having an illuminable caption portion formed thereon for indicating the state of operation and identification of the button, a first circuit comprising first light means for brightly illuminating the first of the buttons, a second circuit comprising second light means and resistance means for relatively dimly illuminating the second of the buttons, and means for switching the resistance means from the second circuit to the first circuit upon actuation of the second button, whereby the more recently operated button is then brightly illuminated and the other of the buttons is dimly illuminated.

Thus, in accordance with aspects of this invention an improved circuit-controlling device is provided which furnishes controller identification and state of operation information in an uncomplicated, readily apparent manner.

Figure 2:
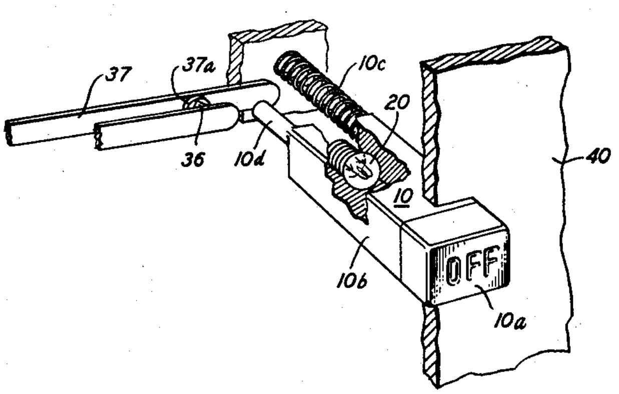

A complete understanding of the present invention and of these and other features thereof may be gained from consideration of the following detailed description in conjunction with the accompanying drawing in which:

Fig. 1 is a circuit diagram of a controller illustrative of the principles of this invention; and Fig. 2 is a perspective view of a push button device of the type employed in the controller of Fig. 1.

The controller shown in Fig. 1 comprises a push button or switch member 10 having, for example, the word "Off" formed on the caption 10*a* thereof (Fig. 2), and another push button 11 having, again by way of example, the word "On" formed on its caption portion 11*a*.

Fig. 1 also includes a relay or plural switching member 13. The relay member 13 has associated with it armature elements 13*a*, 13*b* and 13*c*, the armatures being operatively related to contacts 14, 15 and 16, and 17 and 18, respectively.

Additionally, light sources 20 and 21 are structurally combined with the push buttons 10 and 11, respectively, in the manner shown in Fig. 2.

With the controller arranged as shown in Fig. 1, a closed circuit is formed from ground, through a power source 22, along the armature element 13*b* to the contact 15, to a circuit point 28, and through the light source 20 back to ground. Thus, the light source 20 illuminates the caption 10*a* of the button 10 in, as will be clearly seen from the description to follow, a relatively bright manner.

From the circuit point 28 to ground there is a path in parallel with the above-described circuit of the light source 20. This parallel path extends through a resistive element 29 to a circuit point 30, and then through the light source 21 to ground. Thus, the similar light sources 20 and 21 have unequal voltages applied thereto due to the voltaage drop across the resistive element 29. Accordingly, the source 21 illuminates the caption 11*a* of the button 11 in a relatively dim manner.

Thus, with the controller elements in the position shown in Fig. 1, the "Off" button 10 is brightly illuminated, and the "On" button 11 is dimly illuminated, thereby indicating an off-circuit condition.

An external or controlled circuit (not shown) is connected to circuit points 30, 31 and 32 in any desired manner.

When the "On" button member 11 is depressed, a contact element 33*a* of armature reed 33 is thereby moved into closed circuit relation with contact 34. Thus, a closed circuit path is momentarily formed from ground, through a power source 24, along the armature reed 33 to the contact 34, through the relay member 13, along the lead 35 to a contact 36, along an armature reed 37, and back to ground. This circuit path energizes the relay member 13 and causes the armature reeds 13*a*, 13*b* and 13*c* thereof to move into contact with elements 14, 16 and 18, respectively.

When the momentarily depressed button 11 returns to its unoperated position, contact elements 33*a* and 34 move apart. The relay member 13, however, remains energized because there is a closed circuit path formed from ground, through a power source 26, through the relay-locking contact element 14, along the armature reed 13*a*, through the relay 13, along the lead 35 to the contact 36, along the armature reed 37, and back to ground.

Thus, at almost the first instant that the "On" button 11 is depressed, the resistive element 29 is switched from the series circuit of the light source 21 to the series circuit of the light source 20 by the action of the armature reed 13*b* in moving from the contact 15 to the contact 16.

While the locking or latching armature reed 13*a* is moving into contact with the element 14, and while the switching armature reed 13*b* is moving from the contact 15 to the contact 16, the external circuit armature reed 13*c* moves from the contact 17 to the contact 18, thereby exerting a switching action in the external or controlled circuit.

The noted external circuit condition, i.e., the circuit point 30 connected to the circuit point 32 through the reed 13*c* and the contact 18, persists until such time as the controller is turned off by depressing the button 10. Depression of the button 10 separates the contacts 36 and 37*a* and so interrupts the energizing circuit for the relay member 13, the armatures 13*a*, 13*b* and 13*c* thereby returning to their illustrated positions, and the light levels returning to the off-circuit condition (wherein the "Off" button 10 is more brightly illuminated than the "On" button 11).

Batteries may advantageously be employed as the power sources 22, 24 and 26.

Fig. 2 shows a push button device 10 of a type adapted to be employed in the controller of Fig. 1 as the "Off" button member thereof.

The device 10, which may be mounted in a panel member 40 in any suitable manner, includes the caption portion 10*a*, a translucent body portion 10*b*, the light source 20, a return spring 10*c*, a contact actuating projection 10*d* the armature reed 37, and the contact 36.

The "On" button member of the embodiment of Fig. 1 is similar in structure to the device of Fig. 2.

The described embodiment may also include provisions for turning the controller off or on from a remote position. The remote "off" feature could advantageously take the form of a normally closed switch in series with the lead 35, and the remote "on" feature could comprise a normally open switch in parallel with the contact elements 33*a* and 34.

Thus, illustrative embodiments of this invention are improved latching-type circuit controllers. Such illustrative embodiments enable an operator to tell at a glance whether power is being supplied to the controller (presence or absence of illumination) and to determine whether a powered controller is in an "on" or "off" circuit position. The latter information, which is supplied by a two levels of illumination technique, is displayed in a particularly attention-arresting manner, which manner minimizes confusion in operating complex control systems.

While a specific illustrative embodiment has been described, it is to be understood that the above-described arrangements are illustrative and not restrictive of the principles of the present invention. Other arrangements may be devised by those skilled in the art without departing from the spirit and scope of the invention.

What is claimed is:

1. In combination, two control buttons, each having an illuminable caption portion formed thereon for indicating the state of operation and identification of the button, a first circuit comprising power means and first light means for brightly illuminating the first of said buttons, a second circuit comprising second light means, said power means, and resistance means for relatively dimly illuminating the second of said buttons, and means for switching said resistance means from said second circuit to said first circuit upon actuation of said second button, whereby the more recently operated button is then brightly illuminated and the other of said buttons is then dimly illuminated.

2. A circuit controller comprising a plurality of illuminable switch members, a like plurality of light source circuits respectively combined therewith, a resistive element, and means for switching said resistive element from one to another of said light source circuits, whereby the switch member having said resistive element in its light source circuit is more dimly illuminated than the other switch members.

3. A circuit controller comprising two illuminable push buttons, two light source circuits respectively combined therewith, a resistive element, and means for switching said resistive element from one to the other of said light source circuits, said means relating the state of operation of said controller to a difference in the illumination levels of said buttons.

4. In combination in a circuit controller, a plurality of push buttons, a like plurality of illumination sources respectively combined therewith, each of said sources providing a different level of illumination, and means for selectively varying the levels of illumination of said push buttons in accordance with their actuation.

5. A circuit controller comprising a plurality of light sources, means for selectively applying a different potential to each of said sources, whereby each source thereby provides a different level of illumination, external circuit controlling means, a like plurality of illuminable push buttons respectively arranged in light-receiving relation with said light sources, said push buttons being combined with said means for selectively applying potential and with said external circuit controlling means so that the levels of illumination of said push buttons are selectively varied in accordance with their control of said external circuit controlling means.

6. A circuit controller comprising a plurality of illumination sources, a like plurality of illuminable push buttons respectively arranged in light-receiving relation with said sources, means under control of said push buttons for controlling a circuit by selective operation of said buttons, and means responsive to said selective operation for applying different potentials to said illumination sources to provide button illumination of different brilliancy to indicate different operating conditions of said controller.

7. A circuit controller comprising a first illuminable switch member, a first light source circuit associated therewith, a second illuminable switch member, a second light source circuit associated therewith, a resistive element, and a plural switching member, said member including means for switching said resistive element from one to another of said circuits.

8. A circuit controller comprising two illuminable switch members, two light source circuits respectively combined with said switch members in light transferring relation therewith, and a resistive element, whereby when one of said switch members is actuated said resistive element is switched into the light source circuit of said other member, thereby causing said actuated member to be more brightly illuminated than the other of said switch members.

9. In combination, two unequally illuminated switch members, each of said members having a set of movable contacts combined therewith, each set being positioned so as to move in response to actuation of its associated switch member, relay means in circuit relation with said movable contacts, said relay means including a plurality of switching elements, two light source circuits respectively combined with said switch members, and resistance means in circuit relation with said light source circuits, whereby when the more dimly illuminated switch member is actuated, the movable contacts combined therewith influence the operation of said relay means to cause the switching elements thereof to transfer said resistance means into the light source circuit of said other switch member, whereby the actuated member is then more brightly illuminated than the other of said switch members.

References Cited in the file of this patent

UNITED STATES PATENTS

| | | |
|---|---|---|
| 2,131,942 | Evans | Oct. 4, 1938 |
| 2,307,315 | Wolfe | Jan. 5, 1943 |
| 2,465,794 | Fereday | Mar. 29, 1949 |
| 2,481,137 | McNiel | Sept. 6, 1949 |
| 2,759,130 | Brewer | Aug. 14, 1956 |
| 2,786,989 | Smith | Mar. 26, 1957 |
| 2,825,851 | Lidiak | Mar. 4, 1958 |